United States Patent
Casasso

(10) Patent No.: US 8,011,351 B2
(45) Date of Patent: Sep. 6, 2011

(54) METHOD FOR DRIVING SOLENOID-ACTUATED FUEL INJECTORS OF INTERNAL COMBUSTION ENGINES

(75) Inventor: Paolo Casasso, Cuneo (IT)

(73) Assignee: GM Global Technology Operations LLC, Detroit, MI (US)

( * ) Notice: Subject to any disclaimer, the term of this patent is extended or adjusted under 35 U.S.C. 154(b) by 74 days.

(21) Appl. No.: 12/359,831

(22) Filed: Jan. 26, 2009

(65) Prior Publication Data

US 2009/0217914 A1    Sep. 3, 2009

(30) Foreign Application Priority Data

Jan. 28, 2008 (EP) .................................. 08425040

(51) Int. Cl.
*F02M 51/06* (2006.01)
*F02M 51/00* (2006.01)
(52) U.S. Cl. ........................ 123/490; 123/472
(58) Field of Classification Search .................. 123/472, 123/478, 490, 499; 239/585.1; 701/105; 251/129.5
See application file for complete search history.

(56) References Cited

U.S. PATENT DOCUMENTS

| 4,092,717 A | 5/1978 | Di Nunzio |
| 4,355,619 A | 10/1982 | Wilkinson |
| 4,459,670 A | 7/1984 | Yamaguchi et al. |
| 4,576,129 A | 3/1986 | Wallenfang et al. |
| 4,922,878 A * | 5/1990 | Shinogle et al. .............. 123/490 |
| 4,974,622 A * | 12/1990 | Rader ................................ 137/1 |
| 5,161,510 A | 11/1992 | Yamada |
| 5,515,830 A | 5/1996 | Arakowa |
| 6,076,508 A * | 6/2000 | Nakano .......................... 123/490 |
| 6,457,457 B1 * | 10/2002 | Harcombe .................... 123/490 |
| 2003/0183204 A1 | 10/2003 | Vierling et al. |

FOREIGN PATENT DOCUMENTS

EP    0114378 A2    8/1984

OTHER PUBLICATIONS

European Search Report dated Sep. 15, 2008, issued in Application No. 08425010.6.

* cited by examiner

*Primary Examiner* — Mahmoud Gimie
(74) *Attorney, Agent, or Firm* — Ingrassia Fisher & Lorenz, P.C.

(57) ABSTRACT

An accurate control of a solenoid-operated fuel injector in a Diesel or gasoline engine specifies that a pull-in voltage (Vpull-in) higher than the generally available battery voltage (Vbatt) is applied to the injector, and that the injection is ended as quickly as possible, in order that the fuel injection closely follows the solenoid current profile. When the initial pull-in voltage is lower than the expected nominal value, a deviation of the injected fuel quantity appears with respect to the nominal quantity. This inconvenience is overcome by monitoring the actual value of a selected parameter, such as the actual value of the initial pull-in voltage (Vpull-in), and the injection start time (te) and the solenoid energizing time (ET) are correspondingly modified.

19 Claims, 2 Drawing Sheets

METHOD FOR DRIVING SOLENOID-ACTUATED FUEL INJECTORS OF INTERNAL COMBUSTION ENGINES

CROSS-REFERENCE TO RELATED APPLICATION

This application claims priority to European Patent Application No. 08425040.6-2311, filed Jan. 28, 2008, which is incorporated herein by reference in its entirety.

TECHNICAL FIELD

The present invention relates to fuel injection in internal combustion engines. More specifically, the invention relates to a method for driving a solenoid-actuated fuel injector.

BACKGROUND

Fuel injector control systems and methods for internal combustion engines are well-known in the art, for instance from U.S. Pat. Nos. 4,459,670, 4,355,619 and EP-A-0 114 378. Conventional solenoid fuel injectors are provided with solenoid actuators and comprise a valve housing with current coil and electrical connections, a valve seat with a nozzle and a movable valve needle. When such an injector is energized (e.g., a current is sent to the solenoid actuator), the coil generates a magnetic field which lifts the valve needle off of its seat to allow fuel to flow through the injector and to leak out of the nozzle towards the combustion chamber of the associated cylinder. When the injector is de-energized (e.g., the current is no longer sent to the solenoid actuator), the valve needle is pressed against the valve seat.

In order to cause a fuel injection to occur, a nominal start time for the injection and a nominal energizing time (ET) for the injector are predetermined by an electronic injection control unit, taking into account several parameters, such as for instance the amount of fuel to be injected, the engine speed, the engine power, the exhaust emissions. Referring to the graphs of FIG. 1, a voltage V having a predetermined nominal start value Vpull-in ("pull-in voltage") is applied to the injector solenoid at the nominal energizing time (te) to cause in said solenoid the flow of an energizing current I which very quickly increases from zero to a predetermined peak value (Ipull-in or "pull-in current") in a period of time, which is defined as the "pull-in period". The quick increase of the energizing current allows the coil to generate a sufficiently strong force to move a mechanical anchor within the injector, in order to permit the starting movement of the injector needle.

In order to achieve a very fast movement of the anchor the solenoid current I must reach the peak value Ipull-in as quickly as possible. For this reason it is common practice to apply to the injector an initial voltage having a value Vpull-in which is much higher (for instance, between 50 V and 70 V) than the typical voltage value VBATT (for instance 12 V) available from the battery of the motor-vehicle. The higher initial voltage value may be obtained with per se known booster circuits.

Still referring to the graphs of FIG. 1, at the end of the pull-in period, when the anchor lift is opened, there is usually no longer any need to maintain the current I at the peak value, since the fuel pressure itself is now capable to provide part of the force which is necessary to maintain the anchor opened. For this reason, the injector current can be reduced, as shown in the upper graph of FIG. 1, wherein the current I in the injector solenoid is reduced gradually, to subsequent lower levels.

The gradient of the solenoid current I in the pull-in period is essentially proportional to the value Vpull-in of the voltage applied to the injector. That value Vpull-in of the voltage V is generally set through the hardware, but for some reasons in the operation it can be lower than expected, because of the variations of some parameters such as the environmental temperature, the aging of hardware components, etc. If the actual value of the pull-in voltage Vpull-in is lower than the expected nominal value, the slew rate or gradient of the current I in the pull-in period is correspondingly reduced, and the corresponding duration of the pull-in period is correspondingly increased, as shown by three exemplary graphs presented in FIG. 2. As a consequence, the anchor lift movement is correspondingly delayed, as shown by the three exemplary graphs showing the displacement L of the anchor in FIG. 2 (wherein Lc indicates the position of the anchor when the injector is closed and LO indicates the position of the anchor when the injector is open).

Thus, when the pull-in voltage is lower than the expected nominal value, the actual injection starts with a certain delay with respect to the nominal energizing time and the fuel quantity which is actually injected is different from, and in particular smaller than, the expected quantity.

At the end of the energizing time set by the injection control unit, the current I in the injector solenoid must be brought to zero as fast as possible, in order to reduce any further delays and the corresponding differences between the quantity of fuel actually injected and the expected quantity.

In order to bring the injector current I to zero as fast as possible, a voltage having the same magnitude of the initial pull-in voltage is conveniently applied to the injector, however with the opposite or reversed polarity.

Another problem which may arise with the methods according to the prior art is represented by the time distance between two subsequent injections. In some cases, because of the low speed of the anchor in the closing displacement, when two subsequent injections are very close to one another, the two injection times can merge together, producing a total amount of fuel injected which is far from the expected quantity.

In view of the above, it is at least one object of the present invention to improve the accuracy with which a solenoid-actuated fuel injector is driven. In addition, other objects, desirable features, and characteristics will become apparent from the subsequent summary and detailed description, and the appended claims, taken in conjunction with the

SUMMARY

In one embodiment, the method of an embodiment of the present invention is characterized by monitoring the actual value of the initial (pull-in) voltage, and the injection start time and the solenoid energizing time are modified as a function of the value of said initial (pull-in) voltage, so as to at least partially compensate deviations of the actual value of said initial voltage with respect to the nominal value thereof.

According to another embodiment, the actual duration of the time period (pull-in period) needed for the solenoid current to initially pass from zero to the peak value is monitored and the injection start time and the solenoid energizing time are modified as a function thereof.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the application and uses. Furthermore, there is no intention to be bound by any theory presented in the preceding background and summary or the following detailed description.

In a first embodiment the method according an embodiment of the present invention is essentially based on monitoring the actual value of the pull-in voltage: when the actual value of said voltage is lower than expected (i.e., lower than its predetermined nominal value), the injection start time and the solenoid energizing time are modified so as to at least partially compensate the deviation of the actual value of the pull-in voltage with respect to the nominal value. In particular, the injection start time (or the corresponding value of the crank angle) is anticipated with respect to the nominal injection start time, by an amount which is essentially proportional to the detected reduction of the pull-in voltage, and the solenoid energizing time ET is increased with respect to its nominal value, by a amount which is essentially proportional to the reduction of the pull-in voltage.

In general, the functional relationships between the reduction of the pull-in voltage and the corresponding advance of the injection start time and the increase of the solenoid energizing time are obtained beforehand, by means of simple experimental procedures, and can be mapped in memories of the injection control unit.

Figure 3:
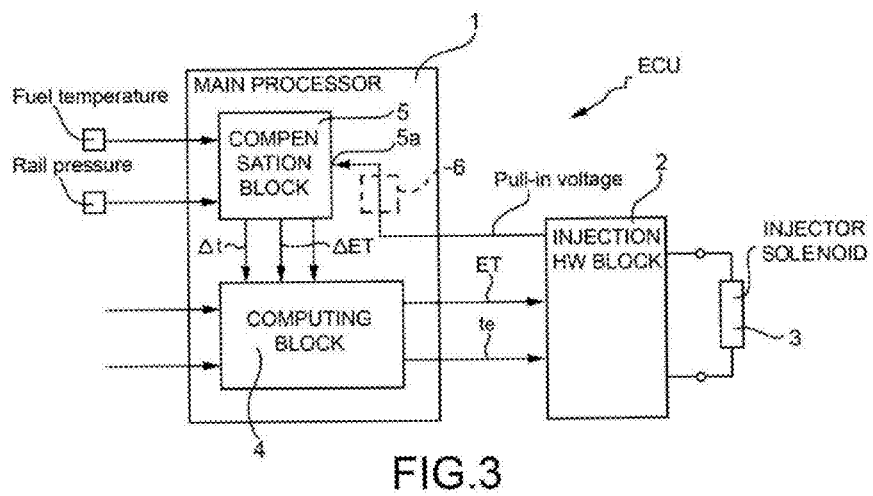
FIG. 3 is a block diagram showing an injection control system operating in accordance with an exemplary embodiment of the method of the present invention.

Referring to FIG. 3, such an electronic unit ECU can comprise a main processor 1, coupled to an injection hardware block 2 which actually drives an injector solenoid 3. The main processor 1 receives a plurality of input signals, providing information as to the values of a number of prefixed parameters, such as the engine speed, the required engine power, etc. In view of causing a fuel injection to occur, a main computing block 4 of the processor 1 in a per se known manner calculates a nominal start time te for the injection and a nominal energizing time ET for the solenoid 3 of the injector as a function of the values of said parameters.

The main processor 1 comprises further a compensation block 5 which at an input 5a receives a signal or data indicative of the actual value of a selected parameter which, in the first embodiment which is presently being described, is the value of the initial pull-in voltage Vpull-in.

The compensation block 5 checks whether the current value of said selected parameter actually corresponds to a predetermined nominal value. If the actual value of the parameter is lower than the corresponding nominal value, the compensation block, by means of the above-mentioned maps preliminarily stored in memory devices, produces a □t signal indicative of the amount by which the injection start time (or crank angle) is to be anticipated with respect to the corresponding nominal value.

Furthermore, the compensation block 5 also provides a □ET signal, indicative of the increase of the solenoid energizing time ET to be added to the corresponding nominal value.

The □t and the □ET signals or data are provided to the computing block 4, which in turn outputs correspondingly modified values of the solenoid energizing time and of the injection start time to the injection hardware block 2.

In motor-vehicles, the electronic control units are generally installed under the hood (i.e., in an environment replete with electromagnetic noise). For this reason, it may be convenient that the monitored pull-in voltage is subjected to a low-pass filtering action, in an analogue or digital filter (indicated 6 in FIG. 3) before being supplied to the compensation block 5. In some cases, the filtered voltage thus obtained may be not accurate enough for performing the above-described compensation method.

Figure 1:
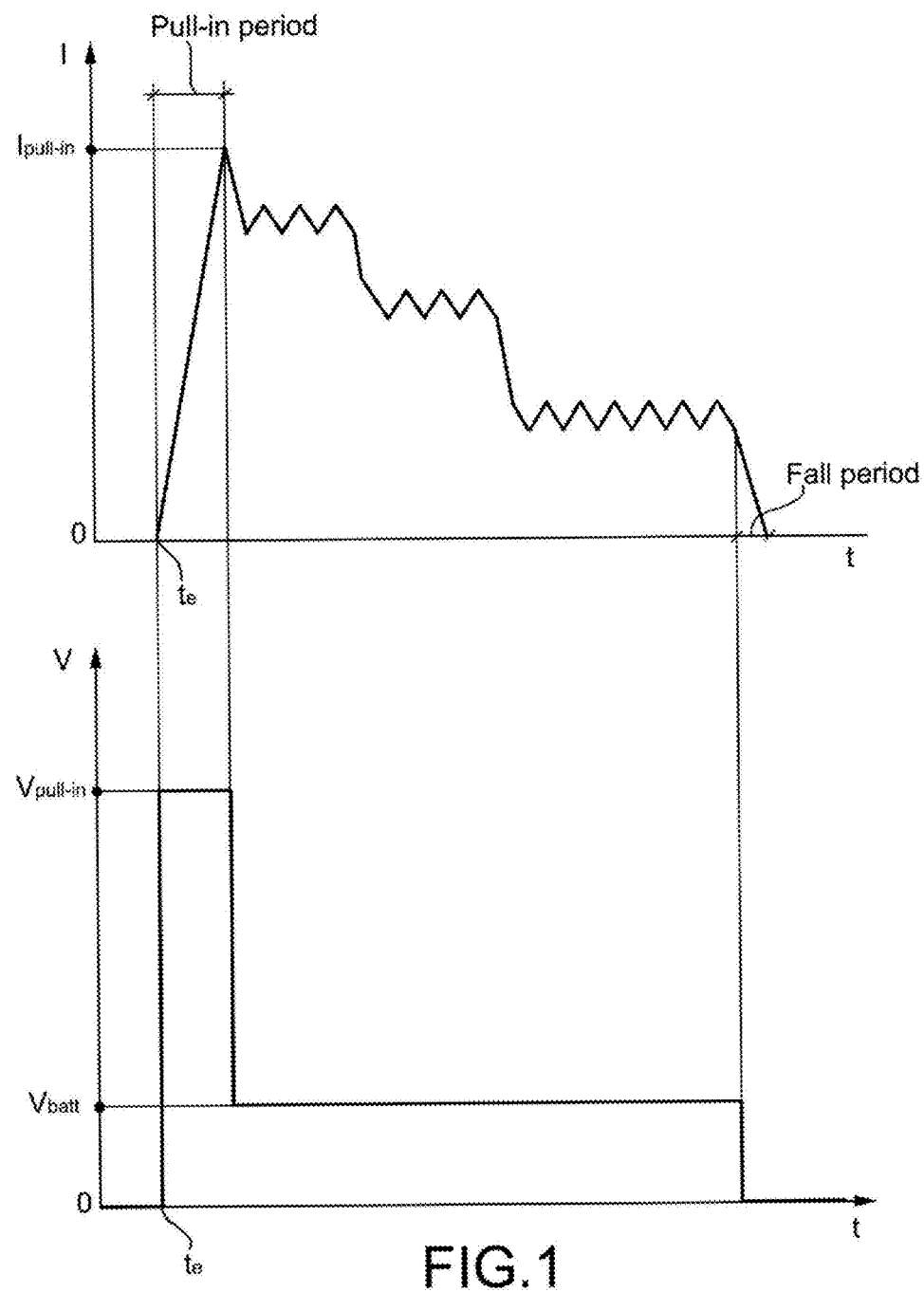
FIG. 1 shows two graphs representing exemplary time developments of the voltage V applied to the solenoid of a fuel injector and the corresponding development of the current I flowing in said solenoid.
Figure 2:
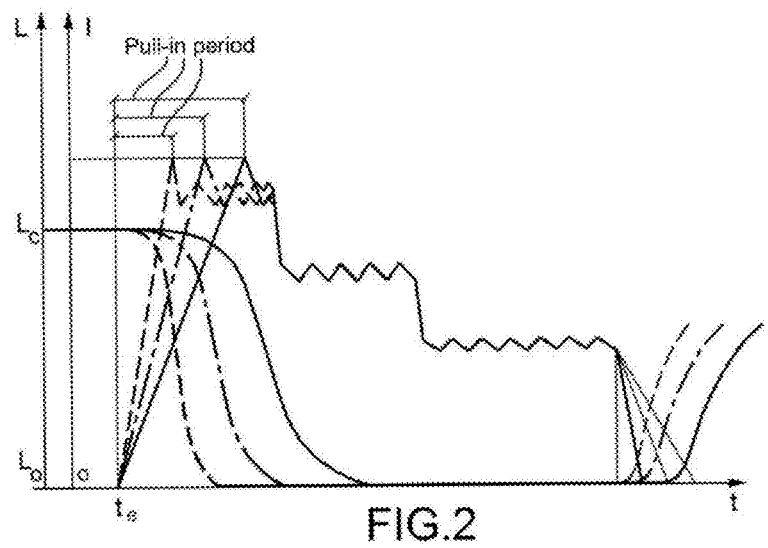
FIG. 2 shows the variations of the solenoid current I and of the displacement L of the anchor of the injector, due to variations of the pull-in voltage V applied to the injector.

In such cases, according to an alternative embodiment of the method of the present invention, the selected parameter to be monitored is the actual duration of the pull-in period (i.e., the time period needed by the solenoid current I to pass from zero to the peak value indicated Ipull-in in FIG. 1). Conveniently, besides monitoring the actual value of the pull-in period, also the actual duration of the injector current fall period (i.e., the time needed by the solenoid current I to finally drop to zero, see FIG. 1) is monitored, and the values of both monitored parameters (pull-in period and fall period) are used to determine, from a previously stored map, the corresponding compensation values for the injection start time and the solenoid energizing time.

In any of the above-described embodiments, the method of the invention may comprise monitoring the time distance between two successive fuel injections by the same injector, and merging two successive fuel injections into a single injection when the time distance becomes smaller than a predetermined minimum threshold value. In this case, the resulting single injection has an energizing time which is equivalent to the merge of the two nominally separate injections.

As already pointed out above, embodiments of the invention allow improved control accuracy of the injection start time and the injector energizing time, and is applicable in both Diesel and gasoline engines.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for driving a solenoid actuated fuel injector of an internal combustion engine for causing a fuel injection to occur, a nominal start time (te) for an injection and a nominal energizing time (ET) for an injector are predetermined as a function of prefixed parameters, and a voltage (V) having an initial predetermined nominal value (Vpull-in) is applied to said solenoid actuated fuel injector at the nominal start time (te) to cause in the solenoid actuated fuel injector a flow of an energizing current (I) which increases from zero to a predetermined peak value (Ipull-in), the method comprising the steps of:

monitoring an actual value of at least one selected parameter that is related to a time period needed for a solenoid current (I) to pass from zero to a peak value (Ipull-in); and when the actual value is lower than a corresponding nominal value for the selected parameter, anticipating an injection start time with respect to the nominal start time (te) by an amount of time that is determined based on functional relationships between the selected parameter and the injection start time, which functional relationships are obtained and mapped in memory beforehand, so as to at least partially compensate deviations of the actual value of said at least one selected parameter with respect to a predetermined nominal value.

2. The method of claim 1, wherein said at least one selected parameter is the actual value of said voltage (V) that is applied to the solenoid actuated fuel injector.

3. A method for driving a solenoid actuated fuel injector of an internal combustion engine for causing a fuel injection to occur, a nominal start time (te) for an injection and a nominal energizing time (ET) for an injector are predetermined as a function of prefixed parameters, and a voltage (V) having an initial predetermined nominal value (Vpull-in) is applied to said solenoid actuated fuel injector at the nominal start time (te) to cause in the solenoid actuated fuel injector a flow of an energizing current (I) which increases from zero to a predetermined peak value (Ipull-in), the method comprising the steps of:

monitoring an actual value of at least one selected parameter that is related to a time period needed for a solenoid current (I) to pass from zero to a peak value (Ipull-in), wherein said at least one selected parameter is an actual duration of the time period needed for the solenoid current (I) to pass from zero to said predetermined peak value (Ipull-in); and modifying the nominal start time (te) and the nominal energizing time (ET) as a function of the actual value of said at least one selected parameter, so as to at least partially compensate deviations of the actual value of said at least one selected parameter with respect to a predetermined nominal value.

4. The method of claim 3, wherein the actual duration of the time period needed for the solenoid current (I) to finally drop to zero is monitored as a further selected parameter.

5. A method for driving a solenoid actuated fuel injector of an internal combustion engine for causing a fuel injection to occur, a nominal start time (te) for an injection and a nominal energizing time (ET) for an injector are predetermined as a function of prefixed parameters, and a voltage (V) having an initial predetermined nominal value (Vpull-in) is applied to said solenoid actuated fuel injector at the nominal start time (te) to cause in the solenoid actuated fuel injector a flow of an energizing current (I) which increases from zero to a predetermined peak value (Ipull-in), the method comprising the steps of:

monitoring an actual value of at least one selected parameter that is related to a time period needed for a solenoid current (I) to pass from zero to a peak value (Ipull-in);

modifying the nominal start time (te) and the nominal energizing time (ET) as a function of the actual value of said at least one selected parameter, so as to at least partially compensate deviations of the actual value of said at least one selected parameter with respect to a predetermined nominal value;

monitoring a time distance between two successive fuel injections by the same injector; and merging said two successive fuel injections in one single injection when said time distance becomes smaller than a predetermined minimum threshold value.

6. The method of claim 5, wherein said at least one selected parameter is the voltage applied to the solenoid actuated fuel injector.

7. The method of claim 6, wherein the modifying step comprises:

anticipating an injection start time with respect to the nominal start time by an amount that is proportional to a detected reduction of the voltage applied to the solenoid actuated fuel injector from the initial predetermined nominal value (Vpull-in).

8. The method of claim 6, wherein the modifying step comprises:

increasing an energizing time with respect to the nominal energizing time by an amount that is proportional to a detected reduction of the voltage applied to the solenoid actuated fuel injector from the initial predetermined nominal value (Vpull-in).

9. The method of claim 5, wherein said at least one selected parameter is a time period needed for the solenoid current (I) to pass from zero to the predetermined peak value (Ipull-in).

10. The method of claim 9, wherein the actual duration of the time period needed for the solenoid current (I) to finally drop to zero is monitored as a further selected parameter.

11. A method for driving a solenoid actuated fuel injector of an internal combustion engine for causing a fuel injection to occur, the method comprising the steps of:

applying a pull-in voltage that is higher than a battery voltage to the solenoid actuated fuel injector;

determining an actual value of the pull-in voltage applied to the solenoid actuated fuel injector;

comparing the actual value with an initial predetermined nominal value (Vpull-in);

when the actual value is lower than the initial predetermined nominal value, determining a reduction in the actual value with respect to the initial predetermined value, wherein the reduction is functionally related to a difference between the actual value and the initial predetermined nominal value, and determining, based on the reduction, one or more amounts by which one or more parameters relating to the fuel injection are to be modified from one or more nominal values, wherein the one or more parameters are selected from a group consisting of an injection start time, a crank angle, and an energizing time, and wherein the one or more nominal values are selected from a group consisting of a nominal start time, a nominal crank angle, and a nominal energizing time; and driving an injection solenoid of the solenoid activated fuel injector in accordance with the one or more amounts by which the one ore more parameters are to be modified.

12. The method of claim 11, wherein the one or more parameters include the injection start time, and wherein determining the one or more amounts comprises determining an amount by which the injection start time is to be anticipated with respect to the nominal start time.

13. The method of claim 12, wherein determining the amount by which the injection start time is to be anticipated comprises determining the amount using functional relationships, which are mapped in a memory, between reductions of the actual value and amounts by which the injection start time is to be anticipated with respect to the nominal start time.

14. The method of claim 11, wherein the one or more parameters include the energizing time, and wherein determining the one or more amounts comprises determining an amount by which the energizing time is to be increased with respect to the nominal energizing time.

15. The method of claim 14, wherein determining the amount by which the energizing time is to be increased comprises determining the amount using functional relationships, which are mapped in a memory, between reductions of the current value and amounts by which the energizing time is to be increased with respect to the nominal energizing time.

16. A method for driving a solenoid actuated fuel injector of an internal combustion engine for causing a fuel injection to occur, the method comprising the steps of:
   determining a nominal start time (te) and a nominal energizing time (ET) for driving the solenoid actuated fuel injector;
   applying a voltage (V) having a predetermined nominal value (Vpull-in) to the solenoid actuated fuel injector at the nominal start time (te) to cause a flow of an energizing current (I) in the solenoid actuated fuel injector, wherein the energizing current increases from zero toward a predetermined peak value (Ipull-in);
   monitoring an actual value of at least one selected parameter that is related to a time period needed for the energizing current to increase from zero to the peak value; and
   modifying driving of the solenoid actuated fuel injector, based on functional relationships between the at least one selected parameter and the injection start time that are mapped in a memory, by performing one or more modifications selected from a group consisting of anticipating the nominal start time (te) and increasing the nominal energizing time (ET) as a function of the actual value of the at least one selected parameter, so as to at least partially compensate deviations of the actual value of the at least one selected parameter with respect to a predetermined nominal value.

17. The method of claim 16, wherein the at least one selected parameter is the voltage (V) that is applied to the solenoid actuated fuel injector.

18. The method of claim 17, wherein the modifying step comprises:
   anticipating an injection start time with respect to the nominal start time by an amount that is proportional to a detected reduction of the voltage applied to the solenoid actuated fuel injector from the initial predetermined nominal value (Vpull-in).

19. The method of claim 17, wherein the modifying step comprises:
   increasing an energizing time with respect to the nominal energizing time by an amount that is proportional to a detected reduction of the voltage applied to the solenoid actuated fuel injector from the initial predetermined nominal value (Vpull-in).

* * * * *